United States Patent Office 3,352,813
Patented Nov. 14, 1967

3,352,813
CURABLE COMPOSITIONS COMPRISING A POLYGLYCIDYL ETHER OF A NOVOLAC RESIN, A TERTIARY AMINE, AND A DI-ALKYL PHTHALATE
Barry James Hayes, Dorking, England, assignor to Ciba Limited, Basel, Switzerland, a company of Switzerland
No Drawing. Filed Mar. 22, 1966, Ser. No. 536,296
Claims priority, application Great Britain, Apr. 8, 1965, 14,965/65
7 Claims. (Cl. 260—31.8)

This invention relates to hardenable compositions containing an epoxy resin and a plasticiser, and to the use of such compositions as adhesives.

There are many applications for hardenable adhesive formulations which may be cured at room temperature but which also retain their adhesive strength at considerably above room temperature. For example, structural adhesive bonding is a well-established procedure in the aircraft and similar industries, it being recognised that this technique is, in many respects, a better method of construction than are the older methods of rivetting and integral machining. When conventional adhesive formulations have been employed, it has usually been necessary to carry out the bonding operation at elevated temperature and under pressure. The scope of application of structural adhesive bonding has, therefore, hitherto been limited, since the size of the equipment used in the bonding process (namely heated presses and autoclaves) limits the size of the assembly to be bonded, and such equipment is expensive. Hence, cold-setting structural adhesive compositions, the use of which does not necessitate elaborate and expensive equipment, are desirable.

Aircraft are frequently subjected to large changes in ambient temperature, such as from as low as −55° C. at high altitudes to as high as +80° C. under tropical conditions, and even higher in supersonic flight. It is obviously necessary that adhesives used in structural applications in aircraft should retain adequate strength over this large range of temperature. Thus, United States Military Specification MII–A–5090D Type I specifies, inter alia, that the cured structural adhesive shall have a minimum tensile shear strength of 175 kg./sq. cm. at −55° C. and +21° C., and of 88 kg./sq. cm. at +82° C.

The more satisfactory structural adhesives hitherto available are hardenable compositions containing either phenolic resins or polyglycidyl ethers of 2,2-bis(p-hydroxyphenyl)propane (i.e. of Bisphenol A). In general, however, phenolic resins cannot be satisfactorily cured at room temperature. Although polyglycidyl ethers of Bisphenol A may apparently be cured satisfactorily at room temperature with many aliphatic polyamine hardeners, the mechanical properties at room temperature of the cured composition are inferior to those at about 80° C. of cured compositions which have previously been heated to this temperature for some time. This apparent anomaly arises from the post-curing which occurs when the composition is heated during testing.

It is known that hardenable compositions containing, in addition to a polyglycidyl ether of Bisphenol A and a conventional aliphatic polyamine hardener, a plasticiser, such as a dialkyl phthalate, may be cured at room temperature to yield products having superior adhesive strength at room temperature. However, fully-cured products of this type do not possess high adhesive strength at about 80° C., showing that the presence of the plasticiser seriously impairs the thermal resistance of the product. A plasticising effect may also be obtained by incorporating acyclic long chain polyolefines or hardening agents which similarly contain long chains of carbon atoms, such as amino group-containing polyamides prepared by condensing aliphatic polyamines with di- or trimerised unsaturated fatty acids. In both cases, however, the adhesive strength of the cured compositions at elevated temperatures are unsatisfactory.

It is also known that cured polyglycidyl ethers of novolac resins, i.e. of condensation products obtained under acid conditions, of phenols with formaldehyde, frequently have higher heat resistance than do cured polyglycidyl ethers of Bisphenol A. It has been found, however, that the heat resistance of cured products obtained from a polyglycidyl ether of a novolac, a plasticizer such as di-n-butyl phthalate, and an aliphatic polyamine hardener in which the only reactive groups are primary and/or secondary amino groups, such as triethylenetetramine, is not adequately superior to that of similar products wherein the resin is a polyglycidyl ether of Bisphenol A. It has now surprisingly been found that by the use of, as curing agents, certain tertiary amines in such compositions there may be obtained cured products having high heat resistance over a wide range of temperatures.

The present invention accordingly provides hardenable compositions comprising a polyglycidyl ether of a novolac resin, a tertiary amine as hardening agent of the formula: $R^1R^2NCH_2R^3$ (in which $R^1$ and $R^2$ are the same or different alkyl groups of 1 to 3 carbon atoms each, and $R^3$ is an alkyl, aryl, aralkyl, or cycloalkyl group which may be substituted by phenolic or alcoholic hydroxyl or primary, secondary, or tertiary amino groups) and a dialkyl ester of o-phthalic acid in which each alkyl group contains from 2 to 8 carbon atoms. The invention includes within its scope a process for securing adhesion between two surfaces which comprises curing a layer of a hardenable composition aforesaid sandwiched between the two surfaces.

Suitable tertiary amines used as hardening agents include, for example, triethylamine, N-methyldiethylamine, N-benzyldimethylamine, N,N-dimethyl- and higher-dialkyl- propane-1,3-diamines, pentamethyldiethylenetriamine, 2,4,6-tris(dimethylaminomethyl)-phenol, and N,N-dimethyl- and diethylethane-1,2-diamines, and N,N-dialkylaminoalkanols. The preferred hardening agents are those tertiary amines of the aforesaid formula in which $R^3$ is alkyl of up to 6 carbon atoms substituted by hydroxy or primary or tertiary amino, especially N,N-dimethylpropane-1,3-diamine, N,N-diethylpropane-1,3-diamine, 2-(dimethylamino)ethanol, 2-(diethylamino)ethanol, N-methyldiethylamine and N,N,N',N'',N''-pentamethyldiethylenetriamine. For more rapid curing, use of N,N-dimethylpropane-1,3-diamine or 2-(dimethylamino)ethanol is preferred, but when a longer curing time is desired, use of N,N-diethyl-propane-1,3-diamine or 2-(diethylamino) ethanol is preferred.

In some circumstances it is desirable that not only should the adhesive cure slowly, but that joints of adequate strength should be obtained on subsequent bonding after the adherends, coated with the uncured adhesive, had been freely exposed for several hours to atmospheric moisture and carbon dioxide. Examples where such circumstances may arise are, e.g. in the coating of adherends of large area, where the time required to apply a uniform film of adhesive to the adherends may be considerable; and when other mechanical operations have to be carried out before the adherends are brought into contact with each other, e.g. when panels which are to be rivetted to a structure are first coated on the inner surface with an adhesive so as to improve the fatigue life of the bonded assembly. Tertiary amines preferred for use in such circumstances are N,N-diethyl-propane-1,3-diamine, N-methyldiethylamine, and N,N,N',N'',N''-pentamethyldiethylenetriamine.

Polyglycidyl ethers of novolac resins used in the hardenable compositions of the present invention may be prepared in a conventional manner by reaction in the presence of an acid catalyst between a phenol (such as phenol itself, a chlorophenol, or an alkylphenol, e.g. o-cresol) and an aldehyde, especially formaldehyde, followed by reaction of the novocal obtained with epichlorohydrin in an alkaline medium. Preferably the novolac resin is one prepared from phenol itself and formaldehyde, and it is particularly preferred to use a polyglycidyl ether of such a novolac resin, having an epoxide content of 5.3 to 5.6 equivalents/kg.

Suitable dialkyl phthalate plasticizers are, e.g., diethyl phthalate, di-n-propyl phthalate and di-n-butyl phthalate, use of di-n-bctyl phthalate being particularly preferred. The amount of such plasticiser is generally 20 to 40 parts per 100 parts by weight of epoxy novolac.

Although tertiary amines are usually considered to function catalytically as curing agents, it has been found that the ratio of the tertiary amine hardening agent to the polyglycidyl ether of a novolac resin in the hardenable compositions of the present invention, is an important factor. Use of too small an amount of hardening agent gives rise to products having poor heat resistance, while use of an excessive amount gives rise to products having low adhesive strength both at room temperatures and at elevated temperatures. The optimum ratio in each case may readily be found by routine experiment. By way of illustration, about 12 parts by weight of N,N-dimethylpropane-1,3-diamine may be used per 100 parts by weight of a polyglycidyl ether, having an epoxide content of about 5.5 equivalents per kg., of a novolac resin prepared from phenol and formaldehyde.

It has also been found that the ratio of the dialkyl phthalate to the polyglycidyl ether is an important factor and that the ratio producing the product having optimum properties varies with the nature and amount of the polyglycidyl ether of a novolac resin and of the hardening agent. The most suitable ratio may similarly readily be found by routine experiment. By way of illustration, it has been found that a product having satisfactory heat resistance both at room temperature and at 80° C. is obtained if the ratio by weight of di-n-butyl phthalate to polyglycidyl ether, having an epoxide content of about 5.5 equivalents per kg., of a novolac resin prepared from phenol and formaldehyde, in the composition is 20 to 32.5:100, optimum properties being obtained when the ratio is about 27.5:100.

The compositions of the present invention may further contain fillers, such as asbestos fibre and powdered metals, especially aluminium.

The following examples illustrate the invention. Lap-shear strengths of bonds formed with the compositions were determined as follows. Strips, 2.54 cm. wide and 1.63 mm. thick, of the aluminium alloy available under the designation "L 73 Alclad" were degreased and subjected to a pickling process, according to British Ministry of Aviation Aircraft Process Specification DTD–915 B, washed with water and dried. Lap joints were prepared with a 1.27 cm.-overlap, the compositions being allowed to cure at room temperature for 14 days.

Example 1

The epoxy novolac resin used, hereinafter referred to as "Epoxy novolac A," was prepared in a known manner by reaction in the presence of an acid catalyst of phenol and formaldehyde in a molar ratio of 1:0.57, followed by treatment of the product with an excess of epichlorohydrin and with alkali. It has a softening point (determined according to ASTM Specification E28–51T) of about 35° C. and an epoxide content of about 5.5 equiv./kg. For purposes of comparison a liquid polyglycidyl ether of 2,2-bis(4-hydroxyphenyl)propane, having an epoxy content of about 5.2 equiv./kg., and prepared in a conventional manner from Bisphenol A and epichlorohydrin, was also used. It is hereinafter referred to as "Epoxy resin B."

Lap joints were prepared with a composition $a$, in accordance with the present invention and, for purposes of comparison, with compositions $b$ and $c$ prepared from Epoxy resin B. The compositions were constituted as follows, the figures denoting parts by weight.

| Ingredient | Composition | | |
|---|---|---|---|
| | a | b | c |
| Epoxy novolac A | 100 | | |
| Epoxy resin B | | 100 | 100 |
| N,N-dimethylpropane-1,3-diamine | 12 | 10 | 10 |
| Di-n-butyl phthalate | 27.5 | | 24 |

The lesser amount of N,N-dimethylpropane-1,3-diamine used in compositions $b$ and $c$ than in composition $a$, corresponds to the difference in epoxide content of the two epoxy resins used.

After the assemblies had been kept at room temperature for 14 days, the lap-shear strengths of the joints at various temperatures were determined. Results obtained, expressed as kg./sq. cm., were:

| Temperature of test, ° C. | Composition | | |
|---|---|---|---|
| | a | b | c |
| −55 | 220 | | |
| +21 | 263 | 10 | 225 |
| +82 | 207 | 177 | 70 |
| +100 | 180 | | |
| +120 | 69 | | |

It will be seen that composition $a$ provided bonds of adequate strength over a wide range of temperatures. Composition $b$, prepared from a different epoxy resin, afforded bonds which have extremely low strength at room temperature (although the strength was adequate at 82° C., owing to post curing). The incorporation of di-n-butyl phthalate in composition $b$ (i.e. as in composition $c$) resulted in bonds of inadequate strength at 82° C.

Composition $a$ had a thin film gel-time at room temperature of about 2 hours.

Example II

The following compositions were prepared, the figures denoting parts by weight.

| Ingredient | Composition | | |
|---|---|---|---|
| | d | e | f |
| Epoxy novolac A | 100 | 100 | 100 |
| N,N-diethylpropane-1,3-diamine | 14 | | |
| 2-diethylaminoethanol | | 13 | |
| Triethylenetetramine | | | 12 |
| Di-n-butyl phthalate | 20 | 30 | 25 |

Lap-shear strengths of joints at various temperatures were determined as described above. The results obtained, expressed as kg./sq. cm., were:

| Temperature of test, ° C. | Composition | | |
|---|---|---|---|
| | d | e | f |
| −55 | 142 | 182 | |
| +21 | 266 | 234 | 176 |
| +82 | 155 | 106 | 27 |

It will be seen that compositions $d$ and $e$ of the present invention provided bonds of adequate strength over a wide range of temperature. Composition $f$, which contained the same epoxy novolac resin and plasticiser, but a hardener containing only primary and secondary amino groups, gave bonds of inadequate strength, viz. 27 kg./sq. cm. at elevated temperatures: in contrast, a composition comprising Epoxy novolac A (100 parts), di-n-butyl phthalate (27.5 parts) and a hardener containing only tertiary amino groups, viz. N-benzyl-dimethylamine (15 parts), afforded, after cure at room temperature for only 7 days, bonds having a lap-shear strength at +82° C. of 84 kg./sq. cm.

Compositions d and e had thin film gel-times at room temperature of about 7 and 36 hours, respectively.

*Example III*

Compositions were prepared as follows, the figures again denoting parts by weight.

| Ingredient | Composition | | |
|---|---|---|---|
| | g | h | i |
| Epoxy novolac A | 100 | | |
| Epoxy resin B | | 100 | 100 |
| Pentamethyldiethylenetriamine | 8 | | |
| Poly(aminoamide) | | 65 | |
| Triethylenetetramine | | | 10 |
| Di-n-butyl phthalate | 27.5 | | |

The poly(aminoamide) used was a condensation product of a polymerised, unsaturated fatty acid with an alkylene polyamine, available under the designation "Versamid 140."

Lap-shear strengths of joints at various temperatures were determined as described above. The results obtained, expressed as kg./sq. cm., were:

| Temperature of test, ° C. | Composition | | |
|---|---|---|---|
| | g | h | i |
| −55 | 124 | | |
| +21 | 292 | 252 | 64 |
| +82 | 114 | 31 | 22.5 |

It will again be seen that only the composition (i.e. composition g) of the invention afforded bonds of adequate strength over the whole of the temperature range employed.

*Example IV*

A composition comprising an epoxy cresol novolac resin, having an epoxide content of 4.5 equiv./kg. and available under the designation "Kopox 737A" (100 parts), di-n-butyl phthalate (27.5 parts), N,N-diethylpropane-1,3-diamine (11.22 parts), and aluminium powder (100 parts) was cured for 8 days at 22° C. The lap-shear strength of joints so obtained at 22° C. was 272 kg./sq. cm.

*Example V*

The following compositions were prepared, the figures again denoting parts by weight.

| Ingredient | Composition | | |
|---|---|---|---|
| | j | k | l |
| Epoxy novolac A | 100 | 100 | 100 |
| N,N-dimethylpropane-1,3-diamine | 12 | 12 | 12 |
| Di-n-butyl phthalate | 30 | | |
| Dimethyl phthalate | | 30 | |
| Dinonyl phthalate | | | 30 |

Lap-shear strengths of joints at various temperatures were determined as described above, and the resullts obtained, expressed as kg./sq. cm., were:

| Temperature of test, ° C. | Composition | | |
|---|---|---|---|
| | j | k | l |
| +21 | 242 | 122 | 32 |
| +82 | 180 | 188 | 204 |

Only the composition of the invention (i.e. composition j) afforded bonds of adequate strength over the whole of the temperature range employed.

*Example VI*

Compositions were prepared, each containing 100 parts of Epoxy novolac A, 27.5 parts of di-n-butyl phthalate, and either 11 parts of pentamethyldiethylenetriamine ("composition m") or 14 parts of N,N-diethylpropane-1,3-diamine ("composition n"). Lap joints were prepared as previously described, except that the adherends bearing the adhesive were kept apart at room temperature for the period indicated below (i.e., the so-called "open assembly time") before being brought into contact with each other. After being cured for 14 days at room temperature, the lap-shear strengths of the joints, expressed as kg./sq. cm., at various temperatures were:

| | Temperature of Test | | | | | |
|---|---|---|---|---|---|---|
| | +22° C. | | | +82° C. | | |
| Open assembly time (hours) | 0 | 2 | 4 | 0 | 2 | 4 |
| Composition m | 204 | 186 | 190 | 110 | 120 | 95 |
| Composition n | 186 | 190 | 170 | 98 | 74 | 77 |

It will be seen that bonds of adequate strength are obtained, even though the adhesive compositions, in the form of thin films on the adherends, were exposed freely for some hours to atmospheric moisture and carbon dioxide during the open assembly time.

What is claimed is:

1. A curable composition of matter consisting essentially of
    (a) a polyglycidyl ether of a novolac resin;
    (b) as curing agent a tertiary amine selected from the group consisting of (1) monoamines of the formula

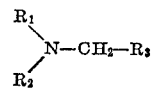

wherein $R_1$ and $R_2$ each are alkyl groups with 1 to 3 carbon atoms, and $R_3$ is a member of the group consisting of alkyl of at most 6 carbon atoms, hydroxyalkyl of at most 6 carbon atoms, aralkyl, cycloalkyl and aryl group, (2) polyamines of the formula

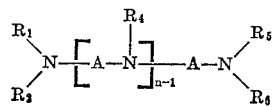

wherein $R_1$ and $R_2$ each are alkyl groups with 1 to 3 carbon atoms, A is an alkylene radical of 2 to 3 carbon atoms, $R_4$, $R_5$ and $R_6$ each are members selected from the group consisting of hydrogen and alkyl group with 1 to 3 carbon atoms, and $n$ is an integer of at least 1 and at the most 3, and (3) polyamines of the formula

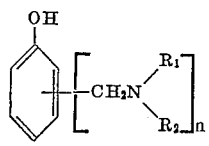

where $R_1$ and $R_2$ each are alkyl groups with 1 to 3 carbon atoms and $n$ is an integer of at least 1 and at the most 3; and (c) a dialkyl ester of ortho-phthalic acid, in which each alkyl group contains from 2 to 8 carbon atoms, said tertiary amine being present in an amount of at least 8 parts of tertiary amine per 100 parts by weight of resin.

2. A composition according to claim 1, wherein the curing agent (b) is a member selected from the group consisting of N,N-dimethylpropane-1,3-diamine, N,N- diethylpropane-1,3-diamine, 2-(dimethylamino)ethanol, 2 - (diethylamino)ethanol, N - methyldiethylamine and N,N,N',N',N",N"-pentamethyldiethylenetriamine.

3. A composition according to claim 1, wherein the dialkyl ester of phthalic acid (c) is a member selected from the group consisting of diethyl phthalate, di-n-propyl phthalate and di-n-butyl phthalate.

4. A composition according to claim 1, containing from 20 to 40 parts by weight of the dialkyl ester of phthalic acid (c) per 100 parts by weight of the polyglycidyl ether of a novolac resin (a).

5. A composition according to claim 1, wherein the polyglycidyl ether (a) is a polyglycidyl ether of a novolac resin obtained by condensation of phenol and formaldehyde in acidic medium.

6. A composition according to claim 5, wherein the said polyglycidyl ether has an epoxide content of 5.3 to 5.6 epoxide equivalents/kg.

7. A composition according to claim 1, which further contains, as filler, aluminium powder.

References Cited

UNITED STATES PATENTS

| 2,839,480 | 6/1958 | Ott et al. | 260—18 |
| 3,004,931 | 10/1961 | Brueschweiler | 260—18 |

OTHER REFERENCES

Skeist, L.: "Handbook of Adhesives," 1962, New York, Reinhold Publishing Co. (page 331 relied on).

Lee et al.: "Epoxy Resins," 1957, McGraw-Hill Co. (pages 94–95 relied on).

JULIUS FROME, *Primary Examiner.*

A. HOLTZ, *Assistant Examiner.*